(12) United States Patent
Jones et al.

(10) Patent No.: US 12,377,378 B2
(45) Date of Patent: *Aug. 5, 2025

(54) COMBINATION VACUUM AND AIR PURIFIER SYSTEM AND METHOD

(71) Applicant: EyeVac, LLC, Austin, TX (US)

(72) Inventors: Terry G. Jones, Austin, TX (US); Hua Wenbin, Suzhou (CN)

(73) Assignee: EyeVac, LLC

( * ) Notice: Subject to any disclaimer, the term of this patent is extended or adjusted under 35 U.S.C. 154(b) by 94 days.

This patent is subject to a terminal disclaimer.

(21) Appl. No.: 17/965,248

(22) Filed: Oct. 13, 2022

(65) Prior Publication Data
US 2023/0249115 A1    Aug. 10, 2023

Related U.S. Application Data (63) Continuation of application No. 16/454,360, filed on Jun. 27, 2019, now Pat. No. 11,471,814.

(Continued)

(51) Int. Cl.
*B01D 46/46* (2006.01)
*A47L 7/00* (2006.01)
(Continued)

(52) U.S. Cl.
CPC ............ *B01D 46/46* (2013.01); *A47L 7/0085* (2013.01); *A47L 9/102* (2013.01); *A47L 9/281* (2013.01);
(Continued)

(58) Field of Classification Search
None
See application file for complete search history.

(56) References Cited

U.S. PATENT DOCUMENTS 11,471,814 B2 * 10/2022 Jones ................. A47L 9/102
2004/0177467 A1 * 9/2004 Jones .................. A47L 5/38
15/310

(Continued)

FOREIGN PATENT DOCUMENTS

KR        100812285 B1 *  3/2008  ........... A47L 9/0072
KR       20180017771 A  *  2/2018  ........... F24F 11/0001
WO    WO-2018190003 A1 * 10/2018  ......... B01D 46/0038

OTHER PUBLICATIONS

KR100812285B1_ENG (Espacenet machine translation of Jeon) (Year: 2008).*

(Continued)

*Primary Examiner* — Gabriel E Gitman
(74) *Attorney, Agent, or Firm* — The Langley Law Firm, P.C.

(57) ABSTRACT

A system for environmental maintenance includes a vacuum unit, an air purifier unit, a controller communicatively connected to the vacuum unit and the air purifier unit, a sweep sensor communicatively connected to the controller, and a movement sensor communicatively connected to the controller. The sweep sensor detects debris and sweeper swept into a detectable vicinity of the sweep sensor and the controller turns on the vacuum unit upon detection by the sweep sensor. The controller turns on the air purifier unit upon the vacuum unit being turned on, and the air purifier unit cycles on for a period as programmed in the controller. The movement sensor detects movement in detectable vicinity of the movement sensor and the controller turns on the air purifier unit upon detection by the sweep sensor, if the air purifier is not already turned on.

2 Claims, 6 Drawing Sheets

Related U.S. Application Data

(60) Provisional application No. 62/844,181, filed on May 7, 2019.

(51) Int. Cl.
*A47L 9/10* (2006.01)
*A47L 9/28* (2006.01)
*B01D 46/00* (2022.01)
*F24F 8/80* (2021.01)
*F24F 8/10* (2021.01)
*F24F 11/30* (2018.01)

(52) U.S. Cl.
CPC ...... *B01D 46/0038* (2013.01); *B01D 2279/55* (2013.01); *F24F 8/10* (2021.01); *F24F 8/80* (2021.01); *F24F 11/30* (2018.01)

(56) References Cited

U.S. PATENT DOCUMENTS

| | | | |
|---|---|---|---|
| 2008/0206092 A1* | 8/2008 | Crapser | A61L 9/127 422/123 |
| 2018/0078107 A1* | 3/2018 | Gagnon | A47L 9/20 |
| 2018/0199776 A1* | 7/2018 | Sato | A47L 9/1641 |

OTHER PUBLICATIONS

KR20180017771A_ENG (Espacenet machine translation of Song) (Year: 2018).*
WO2018190003A1_ENG (Espacenet machine translation of Fujii) (Year: 2018).*

* cited by examiner

COMBINATION VACUUM AND AIR PURIFIER SYSTEM AND METHOD

CROSS-REFERENCE TO RELATED APPLICATIONS

The present application is a continuation and has benefit of priority of U.S. patent application Ser. No. 16/454,360, titled, "Combination Vacuum and Air Purifier System and Method", filed Jun. 26, 2019 (which is a conversion and has benefit of priority of U.S. Provisional Patent Application No. 62/844,181 titled "Combination Vacuum and Air Purifier," filed May 7, 2019, which prior application is co-pending and has at least one same inventor of the present application and is herein incorporated by this reference.

TECHNICAL FIELD

The invention generally relates to cleaning systems for home environment, and more particularly relates to a combination of a vacuum with an air purifier to clean refuse and condition the air.

BACKGROUND

A home or shop vacuum device can suction up debris and other particles. The vacuum suction, however, can stir up fines and particulate matter and disperse these in the air. Additionally, dust and small particulates may be passed through any exhaust filters of the vacuum device. Other sources may also generate air pollutants, such as dust, germs and other particles.

It would, therefore, be a significant improvement in the art and technology to provide combination vacuum and air purification in a same device.

SUMMARY

An embodiment of the invention includes a system for environmental cleaning. The system includes a controller, a sensor communicatively connected to the controller, a vacuum communicatively connected to the controller, and an air purifier communicatively connected to the controller.

In various non-exclusive embodiments, the vacuum and/or the air purifier may be controlled manually or by motion sensing by sensors. Additionally in non-exclusive embodiments, the air purifier may be controlled to turn on upon the turning on of the vacuum.

Another embodiment of the invention a system for environmental maintenance. The system includes a vacuum unit, an air purifier unit, a controller communicatively connected to the vacuum unit and the air purifier unit, a sweep sensor communicatively connected to the controller, and a movement sensor communicatively connected to the controller. The sweep sensor detects debris and sweeper swept into a detectable vicinity of the sweep sensor and the controller turns on the vacuum unit upon detection by the sweep sensor. The controller turns on the air purifier unit upon the vacuum unit being turned on, and the air purifier unit cycles on for period as programmed in the controller. The movement sensor detects movement in detectable vicinity of the movement sensor and the controller turns on the air purifier unit upon detection by the sweep sensor, if the air purifier is not already turned on.

Yet another embodiment of the invention is a method. The method includes sensing movement of sweeping of debris in vicinity of a sensor, controlling a vacuum to on upon the sensing movement of sweeping of debris, and controlling an air purifier to on upon controlling the vacuum to on.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
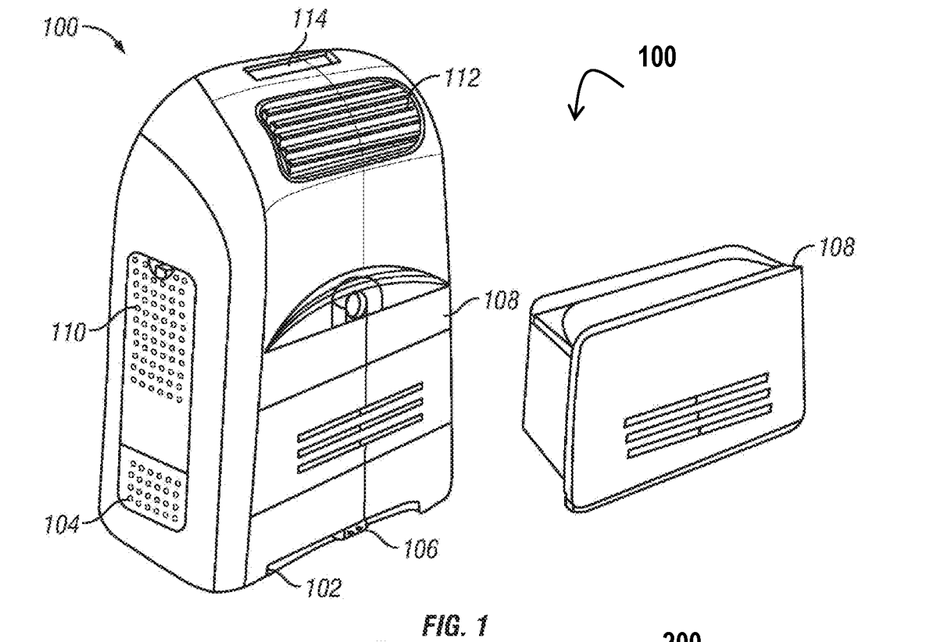
FIG. 1 illustrates a front perspective view of a system for cleaning including a vacuum and an air purifier, according to certain embodiments of the invention.

Referring to FIG. 1, a system 100 includes a vacuum air inlet 102 and a vacuum air outlet 104. A vacuum unit (not shown) connects between the inlet 102 and the outlet 104. A sensor 106 connects to the vacuum unit, to cause the vacuum unit to turn on and vacuum when movement is detected in the vicinity of the sensor 106. The movement is, for example, a sweep of debris into the vicinity of the sensor 106. The vacuum unit may also be turned on via controls of a control panel 114 of the system 100.

Further in the system 100, an air purifier inlet 110 and an air purifier outlet 112 connect to an air purifier unit (not shown). The air purifier unit is, for non-exclusive example, a clean air delivery rate (CADR) 65 m$^3$/hr device operating at 1250 W. The air purifier unit suctions air into the inlet 110 when the vacuum unit is turned on and also may be operable via controls of the control panel 114 of the system 100.

The system 100 further includes respective filters (not shown) between the inlets 102 and 110, respectively, and the outlets 104 and 112, respectively. The system 100 also includes a debris bin 108 that is removable to empty debris collected by the vacuum unit.

In operation, the system 100 operates to vacuum debris swept to the inlet 102 and to purify the air suctioned through the inlet 110. The sensor 106 detects refuse swept into the field of detection, and automatically turns on the vacuum unit for a period to vacuum up the refuse. The vacuum unit may also be operated to on and off by controls of the control panel 114. The air purifier unit may be automatically activated to on (if not already on) for a period during and after the vacuum turns on. The air purifier unit may also, independently of the vacuum, be turned on or off, as desired, via controls of the control panel 114. Various modes of operation of the vacuum unit and the air purifier unit are possible, and modes may be controlled by controls of the control panel 114 or otherwise (e.g., via motion sensing).

Figure 2:
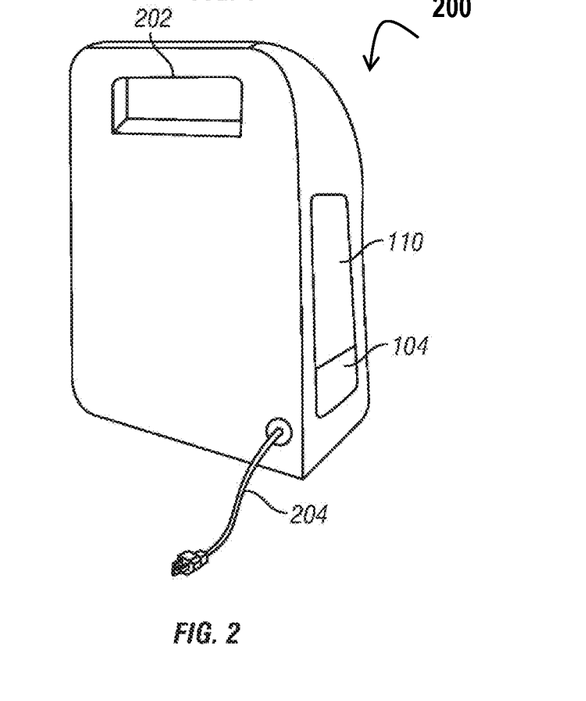
FIG. 2 illustrates a back perspective view of a system for cleaning, such as that of FIG. 1, including a vacuum and an air purifier, according to certain embodiments of the invention.

Referring to FIG. 2, in conjunction with FIG. 1, a system 200, for non-exclusive example substantially the system 100 of FIG. 1, includes a handle 202 for hand grab in moving and carrying the system 100. The system 100 is electrically powered, such as via a cord and plug 204 connectable to an alternating current (AC) outlet or by battery (not shown) or other power source.

Figure 3:
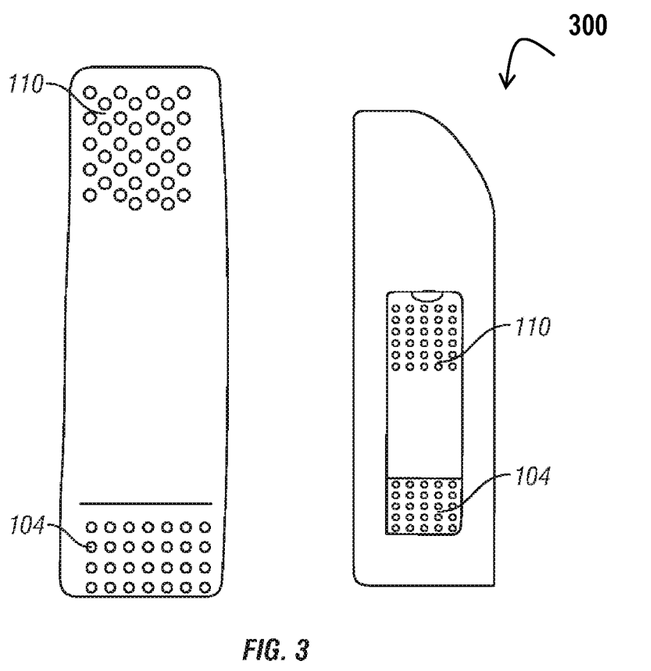
FIG. 3 illustrates a left side view of a system for cleaning, such as that of FIG. 1, including a vacuum and an air purifier, according to certain embodiments of the invention.

Referring to FIG. 3, in conjunction with FIGS. 1 and 2, a system 300, for non-exclusive example substantially the system 100 of FIG. 1 and/or the system 200 of FIG. 2, includes an air purifier unit and a vacuum unit. The purifier air inlet 110 to the air purifier unit and the vacuum air outlet 104 from the vacuum unit are located on a side of the system 100. The location aids the purification of air output by the vacuum.

Figure 4:
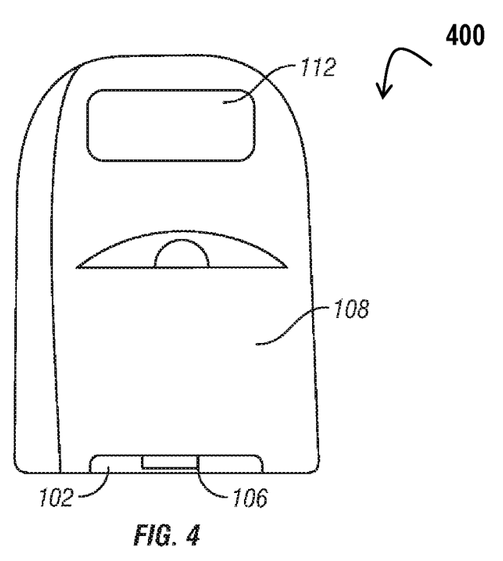
FIG. 4 illustrates a front side view of a system for cleaning, such as that of FIG. 1, including a vacuum and an air purifier, according to certain embodiments of the invention.

Referring to FIG. 4, in conjunction with FIGS. 1-3, a system 400, for non-exclusive example substantially the system 100, 200 and 300, respectively, of FIGS. 1, 2 and/or 3, respectively, includes the air purifier outlet 112 near a top of the system 400. A lower portion of the system 400 is the removable dust bin 108. Below the dust bin 108, the sensor 106 is located adjacent the vacuum air inlet 102.

Figure 5:
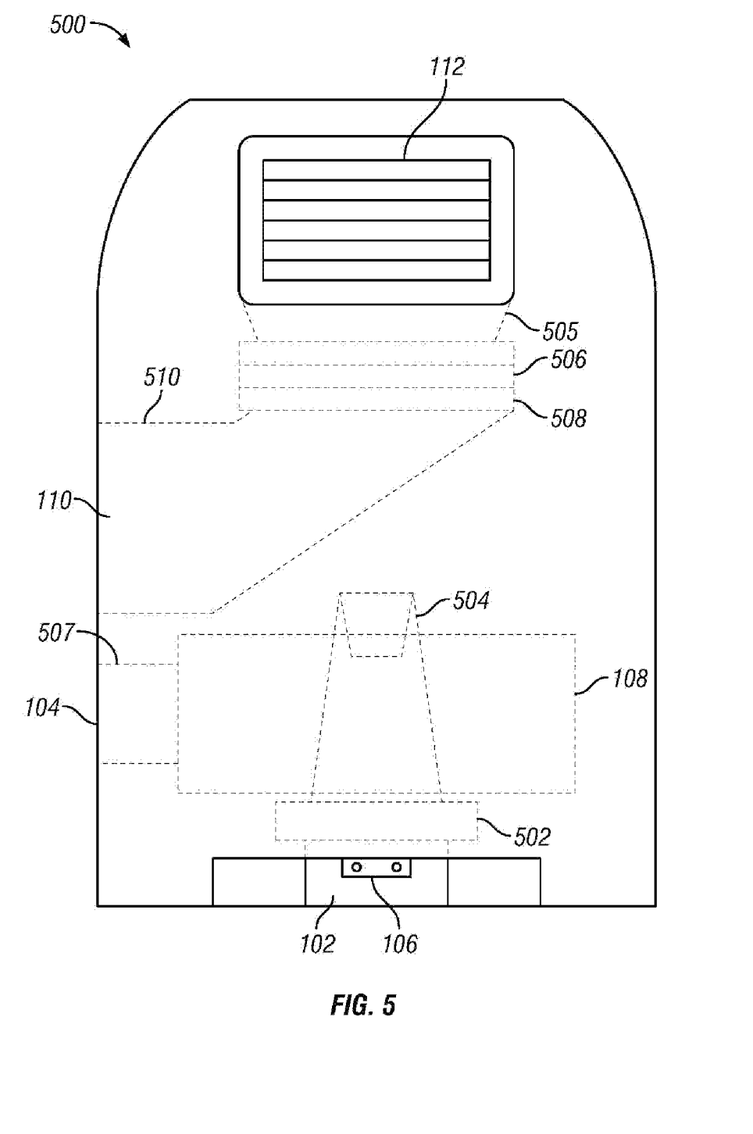
FIG. 5 illustrates a front side view of a system for cleaning, such as that of FIG. 1, including a vacuum and an air purifier and internal ductwork (in phantom) for each, according to certain embodiments of the invention.

Referring to FIG. 5, a system 500, such as for non-exclusive example substantially the system 100, 200, 300 and/or 400, respectively, of FIGS. 1, 2, 3 and/or 4, respectfully, includes (shown in phantom) an air purifier unit and a vacuum unit. A vacuum motor 502, for non-exclusive example, an electrical vacuum, powers the vacuum unit. An air purifier motor 506, for non-exclusive example, an electrical fan, powers the air purifier unit.

The system 500 also includes inlet ductwork 504 of the vacuum unit, which inlet ductwork 504 connects to the vacuum inlet 102 and extends into the dust bin 108 of the system 500. The vacuum outlet 104 is connected via outlet ductwork 507 to the dust bin 108. The vacuum motor 502 suctions debris into the inlet 102 and through the inlet ductwork 504 to the dust bin 108. Exhaust from the vacuum unit passes to the vacuum outlet 104.

Other inlet ductwork 505 connects to the air purifier inlet 110. The air purifier motor 506 draws air into the air purifier inlet 110 and the inlet ductwork 505. The air is then purified, for non-exclusive example, by one or more filter 508 and/or other purification device, such as, for non-exclusive example, ultraviolet (UV) light, other air purifier, air deodorizer and others. The air purifier outlet 110 for purified air is connected to the purification device, e.g., filter 508 or other device, by outlet ductwork 510.

In operation, the vacuum unit is operated to on either by sweep of debris or other movement within detection vicinity of the sensor 106 or by turn on key (not shown in detail) of the control panel 114, or otherwise as desired in the system. The air purifier unit is operated to on either by turn on key (not shown in detail) of the control panel 114, by turn on of the vacuum unit, or by other means. The air purifier unit can be independently operated and/or can be activated when the vacuum unit is activated. A non-exclusive example of operation of the air purifier unit is that the unit is operated on whenever the vacuum unit is operated to on, and the air purifier unit continues on during the vacuum unit operation and for a period of time thereafter to purify exhaust generated by the vacuum unit. Other non-exclusive examples of operation of the air purifier unit and/or the vacuum unit include programmed operations in which time periods of operation are selected, time periods of operation are dictated by respective operations of the air purifier unit and/or the vacuum unit, time periods of operation are based on clock or timer settings, and otherwise.

Figure 6:
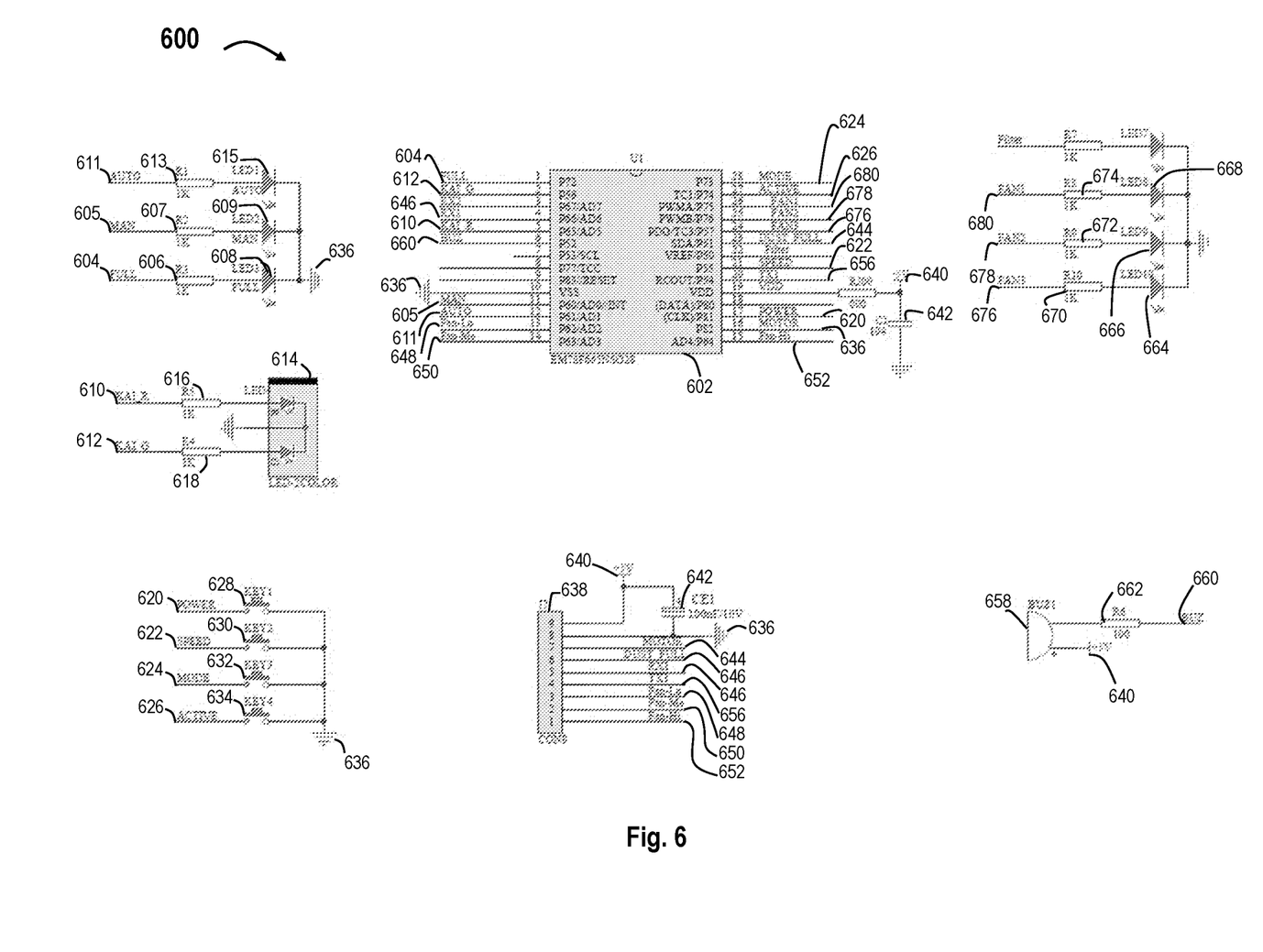
FIG. 6 illustrates a circuit for a system for cleaning, according to certain embodiments of the invention.

Referring to FIG. 6, a circuit 600, for non-exclusive example, an electrical circuit of the systems 100, 200, 300, 400 and/or 500 of FIGS. 1-5, includes a controller 602. The controller 602 connects to a FULL indicator circuit 604 connected to a resistor 606 and a light-emitting diode (LED) 608 or other indicator, which signals that the system is on full power. The controller 602 also connects to a two-color LED 614 (e.g., red and green) or other indicator via circuits 610 and 612 and across resistors 616 and 618, respectively. The two-color LED 614 signals on and off for the system.

The controller 602 further connects to a POWER circuit 620 connected to a POWER switch 628, to a SPEED circuit 622 connected to a SPEED switch 630, to a MODE circuit 624 connected to a MODE switch 632, and to an ACTIVE circuit 626 connected to an ACTIVE switch 634, each connected to ground 636. The POWER switch 628 serves for manual turn on and off of the system via the control panel 114. The SPEED switch 630 serves for setting and varying speed of the air purifier unit and/or the vacuum unit of the system via the control panel 114. The MODE switch 632, via the control panel 114, controls a mode of operation of the air purifier unit and/or the vacuum unit, such as periodic, upon command, or otherwise. The ACTIVE switch 634 of the control panel 114 also controls operations of the system.

A MANUAL LED 609 or other indicator is connected to the controller 602 by a MANUAL circuit 605 across a resistor 607. The MANUAL LED 609 indicates in the control panel 114 that the mode of operation selected is manual, requiring input to the control panel 114 and switches for operations. An AUTO LED 615 or other indicator is connected by an AUTO circuit 611 and through a resistor 613 to the controller 602. The AUTO LED 609 indicates in the control panel 114 that the mode of operation selected is automatic, in which the air purifier unit and/or the vacuum unit operates according to a programmed or other sequence, including, for non-exclusive example, that the air purifier unit turns on whenever the vacuum unit turns on, the vacuum unit turns on when debris is swept into detectable vicinity of the sensor 106, and the air purifier unit continues on for a period thereafter.

A connector 638 of the system connects to a power source 640, such as a 5 Volt source, connected to ground 636 by a capacitor 642, such as a 100μF/10V capacitor. The connector 638 connects to a motor circuit 644, a dust full circuit 646, a fan low circuit 648, a fan medium circuit 650 and a fan high circuit 652, which connect to the controller 602. The power source 640 supplies power to the system. The motor circuit 644 powers the vacuum unit, the dust full circuit 644 indicates the dust bin 108 is full and requires emptying, and the fan low circuit 648 controls the fan of the system for the air purifier unit to low, the fan medium circuit 650 controls the fan to medium, and the fan high circuit 652 controls the fan to high. A TX1 circuit 656 and an RX1 circuit 646 may also connect to the controller 602 for input and output from the controller 602.

A buzzer 658 or similar audio or visual device is connected to the power supply and across a resistor 662 via a buzzer circuit 660 to the controller 602. The buzzer 658 may sound when the dust bin 108 is full, an error in operation occurs, or otherwise according to implementation. Multiple fans may be included in the system, and each fan connects to the controller 602 and to respective fan LEDs 668, 666, 664 across respective resistors 674, 672, 670. A respective fan circuit 680, 678, 676 connects to the controller 602.

Additional, different, or other output devices, input devices, controllers, power sources, and other devices, as well as additional, different or other circuits and connections are possible.

Figure 7:
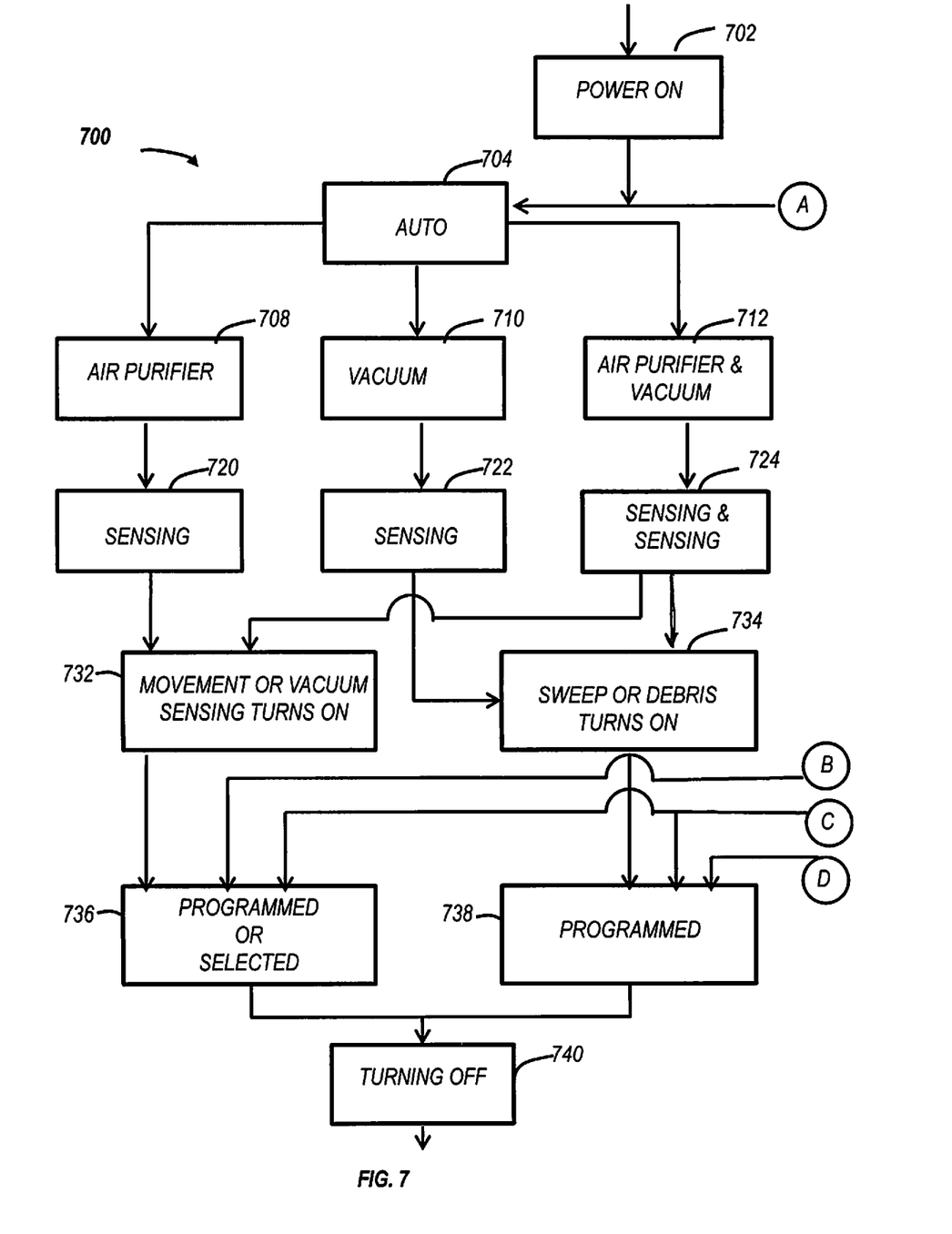
FIG. 7 illustrates a method of operation for a system for cleaning, according to certain embodiments of the invention.

Referring to FIG. 7, a method 700 operates a combined air purifier unit and vacuum unit in systems such as the foregoing. The method 700 commences by turning on 702 the system. When the system is turned on 702, the control panel lights for a user to select operations of the system. The user can select 704 to operate the system on AUTO or select 706 to operate the system on MANUAL.

Automatic operation (AUTO) of the vacuum unit and/or the air purification unit of the system proceeds by a user's selection of automatic programming 704. The user's selection may be made to switches or other control devices of the control panel of the system. The automatic programming 704 of the system proceeds with either automatic programming of air purifying 708, automatic programming of vacuuming 710, and automatic programming of air purifying and vacuuming 712.

Air purifying 708 selection operates the air purifier unit to purify air on cycle, continuous, upon vacuum unit operation, or as set by the user, as applicable. The air purifying 708 may be activated 732 by sensing 720 of a sensor of the system, automatically to commence operating in a cycle or otherwise upon operation of the vacuum unit (e.g., the air purifier turns on when the vacuum turns on, and continues for a period after the vacuum unit turns off), and/or otherwise, and continues operating as per programming or selection 736 or otherwise. Vacuuming 710 selection enables the sensor of the system for sensing 722 to detect a sweep of debris in detectable vicinity of the sensor near the vacuum inlet of the system. Vacuuming 722 commences 734 on sensing 722 motion or otherwise by the sensor of the system, and the vacuuming 722 continues for sufficient period as per programming 738 to vacuum debris swept toward the vacuum inlet of the system or as otherwise implemented. Combined automatic air purifying and vacuuming 712 selection commences the air purifying 708 and the vacuuming 710 to be triggered through respective sensing 724 in accordance with by the air purifier unit in the step 720 and the vacuum in the step 722, respectively. In non- exclusive alternatives, either or both the air purifying unit and vacuum unit can operate according to programmed cycle or user input.

Upon completion of the step 736, the air purifier unit turns off in a step 740. The vacuum unit also turns off in the step 740 after the step 738.

Manual operation (MANUAL) of the vacuum unit and/or the air purification unit of the system proceeds by a user's selection of manual programming 706. The user's selection may be made to switches or other control devices of the control panel of the system. The manual programming 706 of the system proceeds with either manual programming of air purifying 714, manual programming of vacuuming 716, and manual programming of air purifying and vacuuming 718.

Air purifying 726 selection operates the air purifier unit upon switching 726 to on via the control panel, to purify air on cycle, continuous, upon vacuum unit operation, or as set by the user, as applicable. Vacuuming 716 selection operates the vacuum unit upon switching 728 on via the control panel, to vacuum from vicinity of the vacuum inlet of the system. Air purifying and vacuuming 718 selection operates both the air purifier unit and the vacuum unit, respectively, upon switching 726, 728, respectively. As with automatic operation of the vacuum unit and/or the air purification unit of the system, the vacuum unit operates as per programming 738 or as otherwise selected and the air purifier unit operates as per programming 736 or as otherwise selected.

Upon completion of the step 736, the air purifier unit turns off in a step 740. The vacuum unit turns off in the step 740 after the step 738.

As will be understood, wide variation is possible in the foregoing embodiments. Various air purification and/or deodorizing technologies are possible in the air purification unit. Also, the vacuum unit can be any type of vacuum device and can include all possible vacuum technologies. Non-exclusive embodiments include unitized features of the system, as well as component options. For example, the air purifier unit and the vacuum unit can each be contained in a single housing, and parts or all of the respective units may be detachable, such as for cleaning, repair and otherwise. Although housing of the unit is illustrated as standalone and stationary, the combination of air purifier and vacuum can be integrated into moveable and propelled devices or systems. Variation is also possible in the operations of the respective vacuum unit and air purifier unit. Although certain operations and programming are disclosed, numerous other steps, operations, processes and methods may be implemented in the systems.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system, comprising:
   a controller;
   a sensor communicatively connected to the controller;
   a vacuum communicatively connected to the controller;
   an air purifier communicatively connected to the controller;
   a vacuum inlet communicatively connected to the vacuum; and
   a motion sensor communicatively connected to the controller;
   wherein the sensor detects debris swept into a detectable vicinity of the sensor and the controller turns on the vacuum upon detection by the sensor;
   wherein the motion sensor detects movement in the detectable vicinity of the motion sensor and the controller turns on the air purifier upon detection by the motion sensor, if the air purifier is not then turned on by the controller.

2. A system, comprising:
   a vacuum unit;
   an air purifier unit;
   a controller communicatively connected to the vacuum unit and the air purifier unit;
   a sweep sensor communicatively connected to the controller;
   a movement sensor communicatively connected to the controller;

wherein the sweep sensor detects debris swept into a detectable vicinity of the sweep sensor and the controller turns on the vacuum unit upon detection by the sweep sensor;

wherein the controller turns on the air purifier unit upon the vacuum unit being turned on, and the air purifier unit cycles on for a period as programmed in the controller; and wherein the movement sensor detects movement in the detectable vicinity of the movement sensor and the controller turns on the air purifier unit upon detection by the sweep sensor, if the air purifier is not already turned on.

\* \* \* \* \*